(12) United States Patent
Kondo et al.

(10) Patent No.: US 9,106,088 B2
(45) Date of Patent: Aug. 11, 2015

(54) NON-CONTACT POWER TRANSMISSION APPARATUS

(75) Inventors: Tadashi Kondo, Kariya (JP); Yukihiro Yamamoto, Kariya (JP); Sadanori Suzuki, Kariya (JP); Shimpei Sakoda, Kariya (JP)

(73) Assignee: Kabushiki Kaisha Toyota Jidoshokki (JP)

( * ) Notice: Subject to any disclaimer, the term of this patent is extended or adjusted under 35 U.S.C. 154(b) by 595 days.

(21) Appl. No.: 13/412,911

(22) Filed: Mar. 6, 2012

(65) Prior Publication Data

US 2012/0230058 A1    Sep. 13, 2012

(30) Foreign Application Priority Data

Mar. 9, 2011    (JP) .................................. 2011-051901

(51) Int. Cl.
*H02M 3/335*    (2006.01)
*H02J 5/00*     (2006.01)

(52) U.S. Cl.
CPC ....................................... *H02J 5/005* (2013.01)

(58) Field of Classification Search
CPC ............ H02M 3/335; H02M 3/33507; H02M 3/33523; H02M 7/217; H02M 2007/4815; Y02B 70/1416
USPC ................... 363/15, 16, 17, 84, 89, 125, 127; 323/266; 320/108
See application file for complete search history.

(56) References Cited

U.S. PATENT DOCUMENTS

| 5,012,058 | A | * | 4/1991 | Smith ........................... 219/716 |
| 5,428,267 | A | * | 6/1995 | Peil ............................... 315/224 |
| 5,838,558 | A | * | 11/1998 | Tan et al. ........................ 363/91 |
| 7,327,121 | B2 | * | 2/2008 | Chen ............................. 320/141 |
| 2012/0062172 | A1 | * | 3/2012 | Takada et al. ................. 320/108 |
| 2012/0063505 | A1 | | 3/2012 | Okamura et al. |

FOREIGN PATENT DOCUMENTS

| JP | 10-014139 | 1/1998 |
| JP | 2002-010535 | 1/2002 |
| JP | 2012-080521 | 4/2012 |

* cited by examiner

*Primary Examiner* — Gary L Laxton
(74) *Attorney, Agent, or Firm* — Baker & Hostetler LLP

(57) ABSTRACT

A non-contact power transmission apparatus includes a high-frequency converting section, which converts input voltage to high-frequency voltage and outputs it, a primary coil, which receives high-frequency voltage from the high-frequency converting section, and a secondary coil, which receives electric power from the primary coil. The non-contact power transmission apparatus further includes a load to which the electric power received by the secondary coil is supplied, a rectifier located between the secondary coil and the load, and an output adjusting section, which supplies, as pulses, output voltage to the high-frequency converting section. The output adjusting section is configured to increase or reduce output to the load by adjusting a duty cycle of the pulse output.

6 Claims, 7 Drawing Sheets

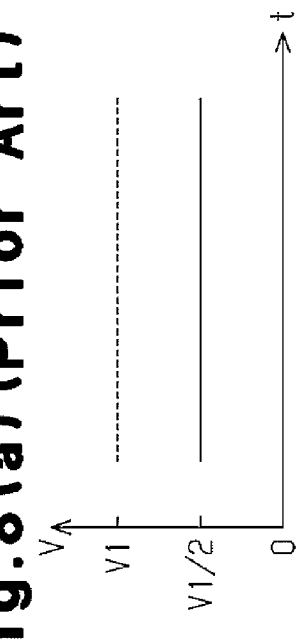
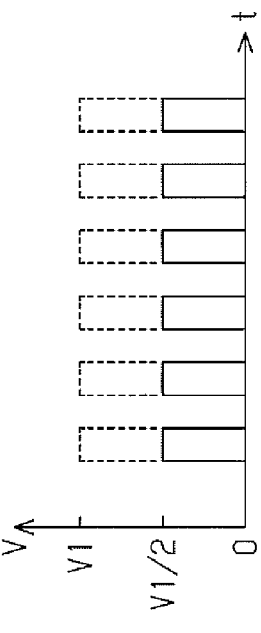
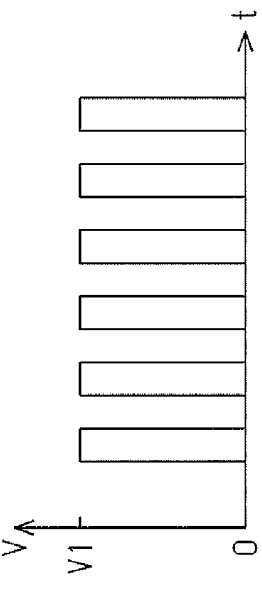
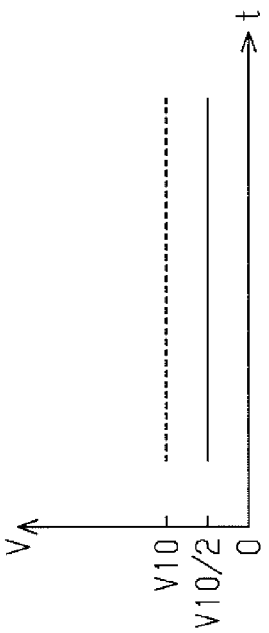
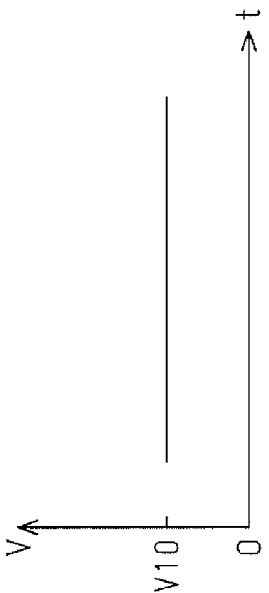

US 9,106,088 B2

NON-CONTACT POWER TRANSMISSION APPARATUS

CROSS-REFERENCE TO RELATED APPLICATION

This application claims priority to Japanese Application No. 2011-051901 filed Mar. 9, 2011.

BACKGROUND

The present invention relates to a non-contact power transmission apparatus.

Japanese Laid-Open Patent Publication No. 2002-10535 discloses a non-contact power transmission apparatus that includes a primary-side non-contact receptacle and a secondary-side non-contact plug. The non-contact receptacle has an inverter circuit and a primary coil for transmitting electric power. When receiving direct voltage, the inverter circuit supplies high-frequency voltage of a constant frequency to the power transmitting primary coil. The secondary-side non-contact plug includes a power receiving secondary coil and rectification-smoothing circuit, which rectifies and smoothes high-frequency voltage excited in the power receiving secondary coil. The inverter circuit executes thinning control to thin high-frequency voltages of certain frequencies that are supplied to the power transmitting primary coil.

FIG. 6 of the present application illustrates a configuration that allows the output of the above described type of non-contact power transmission apparatus to be controlled. In the non-contact power transmission apparatus shown in FIG. 6, a high-frequency power source 100 and a load 160, which is a battery, are connected to each other via a primary coil unit 130, a secondary coil unit 140, and a rectifier 150. The high-frequency power source 100 is formed by an AC/DC section 110 and a DC/RF section 120. The AC/DC section 110 includes a rectifying section 111 and a DC/DC section 112. The rectifying section 111 rectifies the received alternating voltage, and the DC/DC section 112 adjusts the rectified voltage. The DC/RF section 120 converts direct voltage, which is the output voltage of the DC/DC section 112, into high-frequency voltage and outputs it. The DC/DC section 112 raises or lowers the voltage output to the DC/RF section 120 to adjust the output to the load 160.

Specific examples will now be described. FIG. 7 is a waveform diagram illustrating a maximum output state, and FIG. 8 is a waveform diagram illustrating a 50% output state. When in the maximum output state, the DC/RF section 120 receives direct voltage of a voltage value V1 shown in FIG. 7(a), and outputs high-frequency voltage of the voltage value V1 shown in FIG. 7(b). As a result, direct voltage of a voltage value V10 shown in FIG. 7(c), which has been rectified by the rectifier 150, is supplied to the load 160. When in the 50% output state, the DC/RF section 120 receives direct voltage of half the voltage value V1 as shown in FIG. 8(a), or a voltage of a value (V1)/2, and outputs high-frequency voltage of the voltage value (V1)/2 shown in FIG. 8(b). As a result, the direct voltage of a voltage value half the voltage value V10 as shown in FIG. 8(c), or (V10)/2, which has been rectified by the rectifier 150, is supplied to the load 160. In this manner, the DC/DC section 112 changes the amplitude of the output voltage, thereby increasing or reducing the power supplied to the load 160.

In the system configuration shown in FIG. 6, the efficiency of the high-frequency power source, further, the efficiency of the whole system is the accumulation of the efficiencies of all the units. That is, the efficiency of the high-frequency power source is represented by the following expression.

(Efficiency of Rectifying Section 111)×(Efficiency of DC/DC Section 112)×(Efficiency of DC/RF120).

That is, since the efficiency of the whole system is the product of three efficiencies, it is difficult to construct a highly efficient system.

It is an objective of the present invention to provide a non-contact power transmission apparatus that has improved efficiency.

SUMMARY

The present disclosure provides a non-contact power transmission apparatus that includes a high-frequency converting section, which converts input voltage to high-frequency voltage and outputs it, a primary coil, which receives high-frequency voltage from the high-frequency converting section, and a secondary coil, which receives electric power from the primary coil. The non-contact power transmission apparatus further includes a load to which the electric power received by the secondary coil is supplied, a rectifier located between the secondary coil and the load, and an output adjusting section, which supplies, as pulses, output voltage to the high-frequency converting section. The output adjusting section is configured to increase or reduce output to the load by adjusting a duty cycle of the pulse output.

According to this configuration, the input voltage is output after being converted into a high-frequency voltage at the high-frequency converting section. The primary coil receives high-frequency voltage from the high-frequency converting section. The secondary coil receives electric power from the primary coil. The electric power received by the secondary coil is supplied to the load via the rectifier. The output adjusting section converts the output voltage to the high-frequency converting section into pulse output. The output adjusting section also adjusts the duty cycle of the pulse output. As a result, the output to the load is increased or reduced. For example, the above configuration allows the output amplitude to be constant compared to a case in which a DC/DC section increases or reduces the output to a load by adjusting the amplitude of output to a DC/RF section. Accordingly, no DC/DC sections are necessary, and the efficiency is thus improved.

Other aspects and advantages of the invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

FIGS. 7(a), 7(b), and 7(c) are waveform diagrams showing the input voltage and the output voltage of the DC/RF section and the output voltage to the load when the non-contact power transmission apparatus of FIG. 6 is in the maximum output state, respectively; and FIGS. 8(a), 8(b), and 8(c) are waveform diagrams showing the input voltage and the output voltage of a DC/RF section and the output voltage to the load when the non-contact power transmission apparatus of FIG. 6 is in the 50% output state, respectively.

DETAILED DESCRIPTION OF ILLUSTRATIVE EMBODIMENTS

Figure 1:
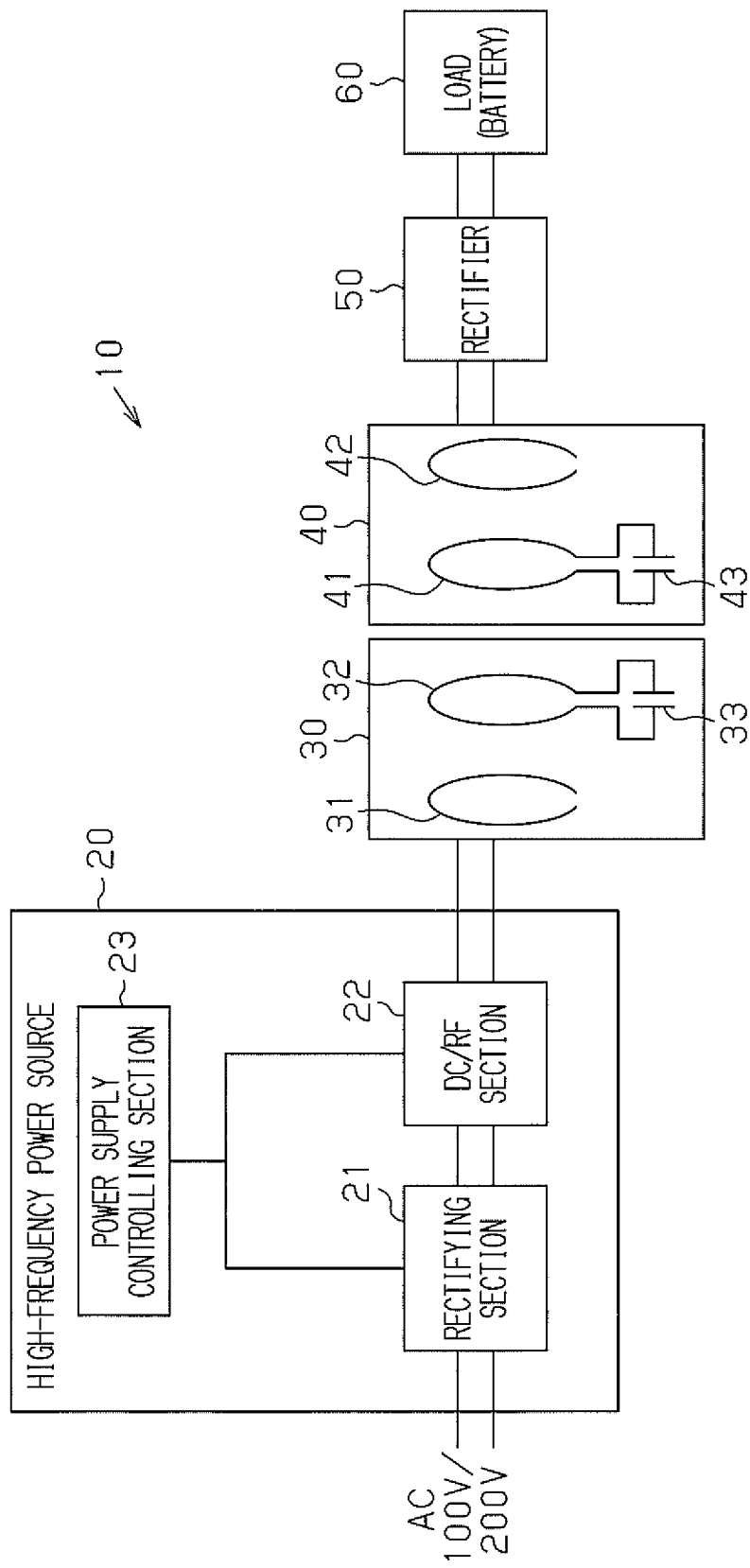
FIG. 1 is a block diagram illustrating the structure of a non-contact power transmission apparatus according to one embodiment.
Figure 2A:
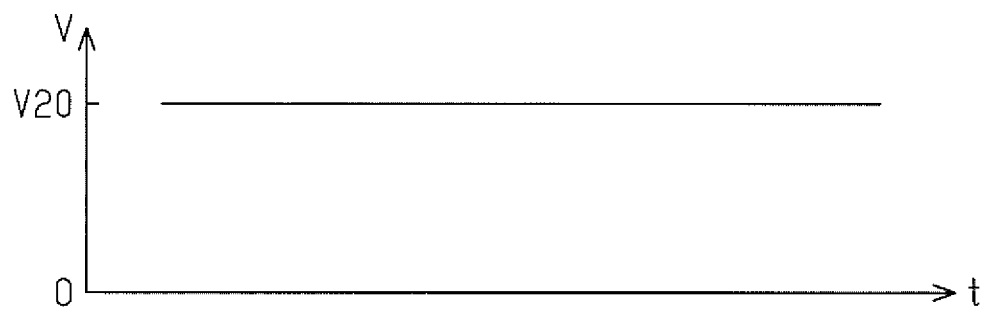
FIGS. 2(a), 2(b), and 2(c) are waveform diagrams showing the input voltage and the output voltage of the DC/RF section and the output voltage to the load when the non-contact power transmission apparatus of FIG. 1 is in the maximum output state, respectively.
Figure 2B:
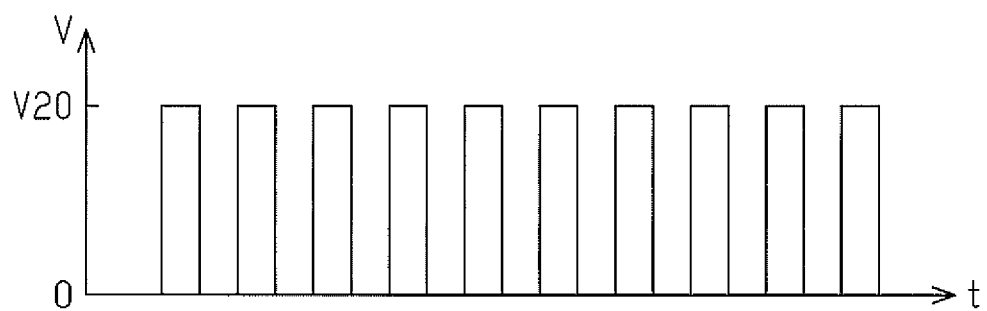
Figure 2C:
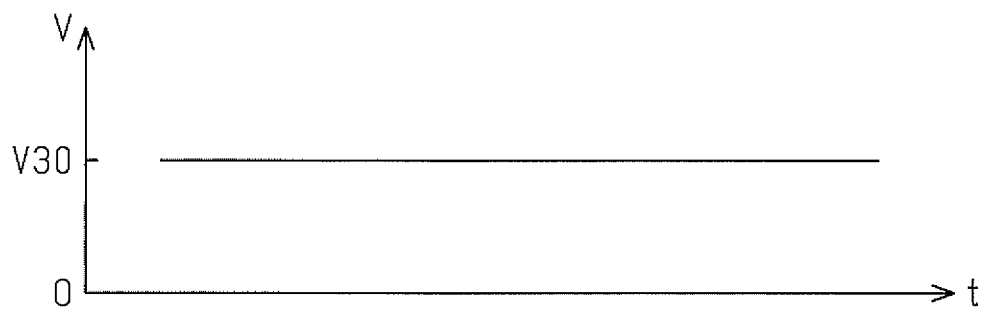
Figure 3A:
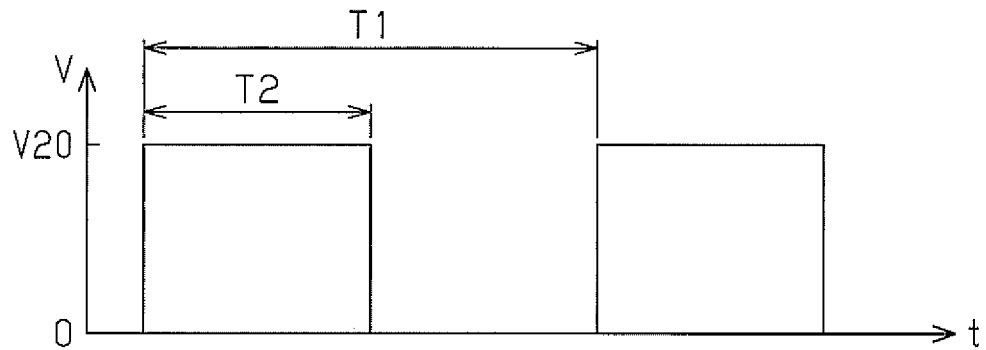
FIGS. 3(a), 3(b), and 3(c) are waveform diagrams showing the input voltage and the output voltage of the DC/RF section and the output voltage to the load when the non-contact power transmission apparatus of FIG. 1 is in the 50% output state, respectively.
Figure 3B:
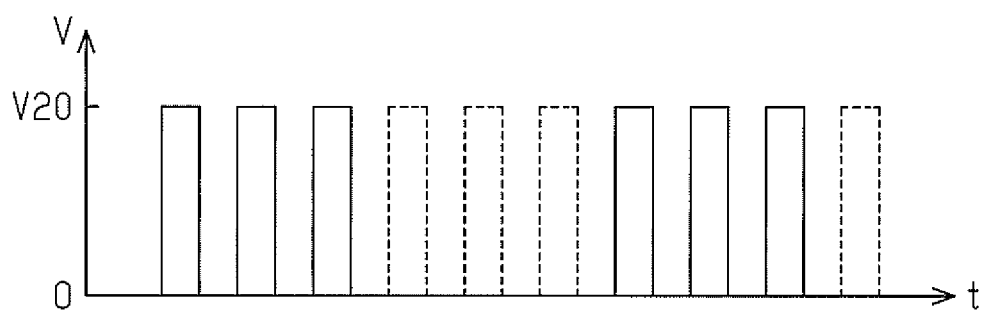
Figure 3C:
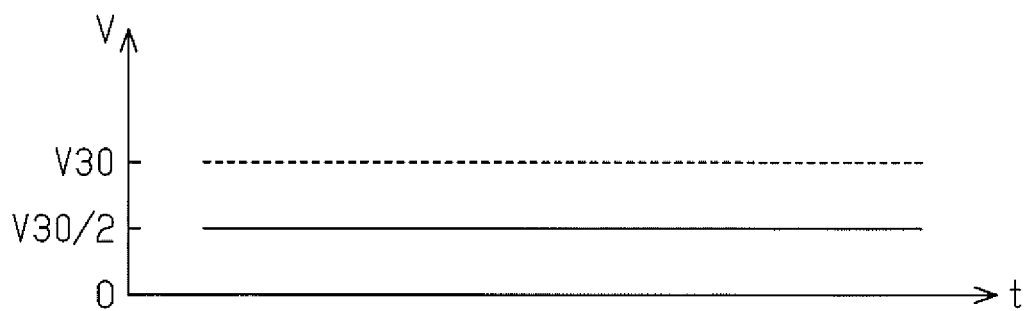

FIGS. 1 to 3 illustrate a non-contact power transmission apparatus 10 according to one embodiment of the present invention.

As shown in FIG. 1, the non-contact power transmission apparatus 10 has a high-frequency power source 20, a primary induction coil 31 connected to the high-frequency power source 20, and a primary resonance coil 32. Further, the non-contact power transmission apparatus 10 includes a secondary resonance coil 41, a secondary induction coil 42, a rectifier 50 connected to the secondary induction coil 42, and a load 60 connected to the rectifier 50. A capacitor 33 is connected in parallel to the primary resonance coil 32. A capacitor 43 is connected in parallel to the secondary resonance coil 41.

The primary induction coil 31, the primary resonance coil 32, and the capacitor 33 form a primary resonator 30. The secondary resonance coil 41, the secondary induction coil 42, and the capacitor 43 form a secondary resonator 40. The primary induction coil 31, the primary resonance coil 32, the secondary resonance coil 41, the secondary induction coil 42, the rectifier 50, the load 60, and the capacitors 33, 43 form a resonant system.

The high-frequency power source 20 outputs a high-frequency voltage. The high-frequency power source 20 includes a rectifying section 21, which functions as an output adjusting section, a DC/RF section 22, which functions as a high-frequency converting section, and a power supply controlling section 23. The rectifying section 21 is connected to a power source of AC 100 volts/200 volts (50 Hz/60 Hz). When receiving alternating voltage, the rectifying section 21 subjects the voltage to full-wave rectification and smoothes the voltage, and outputs the resultant direct voltage. The DC/RF section 22 is connected to the rectifying section 21. The DC/RF section 22 converts input voltage, which is direct voltage from the rectifying section 21, into high-frequency voltage and outputs it.

The rectifying section 21 outputs voltage to the DC/RF section 22 as pulses as shown in FIG. 3(a). The rectifying section 21 has a function to regulate the duty cycle of the pulse output to increase or reduce the output to the load 60. The rectifying section 21 changes the duty cycle of the output based on commands from the power supply controlling section 23. In FIG. 3(a), the duty cycle refers to the ratio of time T2 of H level to time T1 of each cycle, and is represented by T2/T1. The rectifying section 21 changes the duty cycle T2/T1.

The primary induction coil 31, the primary resonance coil 32, the secondary resonance coil 41, and the secondary induction coil 42 are each formed of an electric wire. The electric wires forming the coils are, for example, vinyl insulated wires. The winding diameter and the number of windings of each coil are set in accordance with the level of electric power to be transmitted as needed. In the present embodiment, the primary induction coil 31, the primary resonance coil 32, the secondary resonance coil 41, and the secondary induction coil 42 have the same winding diameters. The primary resonance coil 32 and the secondary resonance coil 41 are identical to each other. Identical capacitors are used as the capacitors 33, 43.

The non-contact power transmission apparatus 10 is applied to a system that performs non-contact charging of a secondary battery, which is a battery mounted on a vehicle. Specifically, the secondary resonance coil 41, the secondary induction coil 42, the capacitor 43, the rectifier 50, and the load 60, which is the battery, are mounted on the vehicle. On the other hand, the high-frequency power source 20, the primary induction coil 31, the capacitor 33, and the primary resonance coil 32 are mounted on a charger for charging the battery in a non-contacting manner. The charger is provided at a ground facility, which is a charging station in the first embodiment.

Operation of the thus configured non-contact power transmission apparatus 10 will now be described.

In a state where the vehicle is stopped at a predetermined position near an electric power supplying device, or the charger, the non-contact power transmission apparatus 10 supplies power to the battery, which is the load 60. In other words, the apparatus 10 transmits electric power to the load 60.

In the high-frequency power source 20, the rectifying section 21 rectifies input alternating voltage. The DC/RF section 22 converts direct voltage into high-frequency voltage and outputs it. The high-frequency power source 20 outputs to the primary induction coil 31 high-frequency voltage at a resonant frequency of the resonant system. The primary induction coil 31 receives high-frequency voltage from the high-frequency power source 20. The electric power from the primary induction coil 31 is supplied to the primary resonance coil 32 by electromagnetic induction. The secondary resonance coil 41 receives electric power from the primary resonance coil 32 by magnetic field resonance. The secondary induction coil 42 extracts electric power received by the secondary resonance coil 41 by electromagnetic induction.

That is, the primary induction coil 31, which serves as a primary coil, receives high-frequency voltage from the DC/RF section 22. The secondary induction coil 42, which serves as a secondary coil, capable of receiving electric power from the primary induction coil 31.

The electric power received by the secondary induction coil 42 is supplied to the load 60. The rectifier 50, which is located between the secondary induction coil 42 and the load 60, rectifies the electric power received by the secondary induction coil 42, thereby supplying direct voltage to the load 60, which is for example, a battery.

Next, increase and reduction of high-frequency output electric power performed by the non-contact power transmission apparatus 10, that is, increase and reduction of output voltage to the load 60, will be described.

In the high-frequency power source 20, the power supply controlling section 23 outputs commands to the rectifying section 21 in accordance with the state of the load 60, for example, the charging status of the battery, thereby changing the duty cycle of the output from the rectifying section 21. That is, although the amplitude of the pulse output of the high-frequency power source 20 is constant, the voltage output to the load 60 is increased or reduced by changing the duty cycle of the output.

FIG. 2 includes waveform diagrams representing the maximum output state of the non-contact power transmission apparatus 10. FIG. 3 includes waveform diagrams representing the 50% output state of the non-contact power transmission apparatus 10. Solid lines in FIG. 3 represent a duty cycle of 50%.

When the non-contact power transmission apparatus 10 is in the maximum output state, the DC/RF section 22 of the high-frequency power source 20 receives direct voltage of a voltage value V20 as shown in FIG. 2(*a*), and outputs high-frequency voltage of the voltage value V20 as shown in FIG. 2(*b*). After being rectified by the rectifier 50, the direct voltage of a voltage value of V30 shown in FIG. 2(*c*) is supplied to the load 60.

When the non-contact power transmission apparatus 10 is in the 50% output state, the DC/RF section 22 of the high-frequency power source 20 receives direct voltage of a duty cycle of 50% as shown in FIG. 3(*a*), and outputs high-frequency voltage as pulses shown in FIG. 3(*b*). For example, three short pulses of FIG. 3(*b*) are output from a single pulse of FIG. 3(*a*). Then, zero output continues for a period corresponding to three short pulses (represented by broken lines in FIG. 3(*b*)). Thereafter, three short pulses are output. The number of pulses in FIG. 3(*b*) is half the number of pulses in FIG. 2(*b*). After being rectified by the rectifier 50, the direct voltage of a value half the voltage value of V30, or (V30)/2, is supplied to the load 60 as shown in FIG. 3(*c*).

In this manner, although the output amplitude of the high-frequency power source 20 is constant, the output voltage can be increased or reduced by changing the duty cycle of the output. Therefore, the high-frequency power source 20 of FIG. 1 does not require the DC/DC section 112 (see FIG. 6) for adjusting the output amplitude of high-frequency power source. Having no DC/DC section 112, the non-contact power transmission apparatus 10 of FIG. 1 increases the efficiency of the high-frequency power source 20. In the non-contact power transmission apparatus 10 having the system configuration shown in FIG. 1, the efficiency of the high-frequency power source 20, further, the efficiency of the whole system is the accumulation of the efficiency of all the units.

That is, the efficiency of the high-frequency power source 20 is represented by the following expression:

(Efficiency of Rectifying Section 21)×(Efficiency of DC/RF Section 22)

That is, the efficiency of the high-frequency power source 20 is the product of two efficiencies. Therefore, the non-contact power transmission apparatus 10 of FIG. 1 can construct a highly efficient system.

Figure 6:
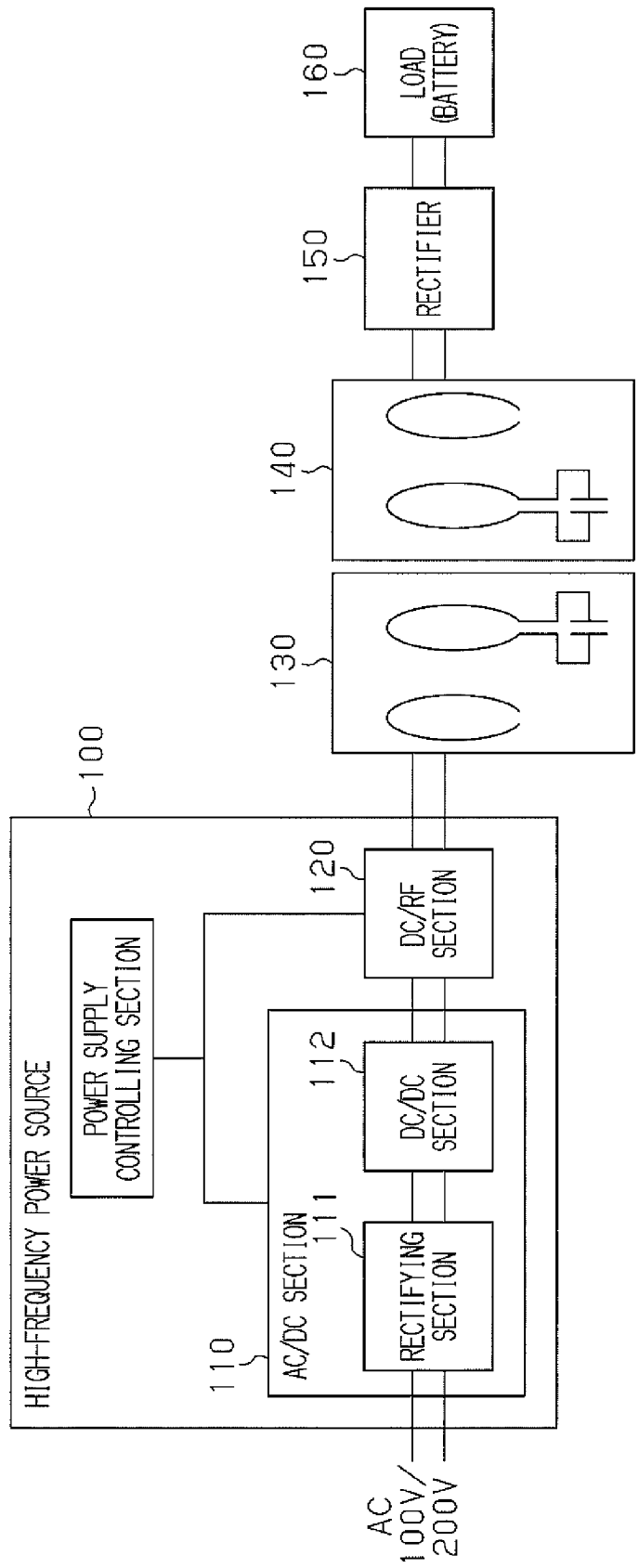
FIG. 6 is a block diagram illustrating the structure of a typical non-contact power transmission apparatus.

More specifically, suppose that, in the system configuration of FIG. 6, the efficiency of the rectifying section 111 is 90%, the efficiency of the DC/DC section 112 is 90%, and the efficiency of the DC/RF section 120 is 90%. In this case, the efficiency of the whole high-frequency power source 100 is 72.9% (72.9=0.9×0.9×0.9). In contrast, according to the present embodiment of FIG. 1, if the efficiency of the rectifying section 21 is 90%, and the efficiency of the DC/RF section 22 is 90%, the efficiency of the whole high-frequency power source 20 is 81% (81=0.9×0.9). As just described, the non-contact power transmission apparatus 10 of FIG. 1 is a highly efficient system.

The present embodiment as illustrated above has the following advantages.

(1) The high-frequency power source 20 outputs the output to the primary induction coil 31, or the RF output, not as continuous wave, but as pulse output. Further, the high-frequency power source 20 varies the duty cycle of the pulse output to increase or reduce the RF output. Therefore, the high-frequency power source 20 of FIG. 1 does not require the DC/DC section 112 shown in FIG. 6. As a result, the efficiency of the power source is improved. That is, the system efficiency of the whole non-contact power transmission apparatus 10 is improved. For example, in a typical non-contact power transmission apparatus, the DC/DC section 112 adjusts the amplitude of output to DC/RF section to increase or reduce the output to a load. However, in the present embodiment, the output amplitude of the high-frequency power source 20 can remain constant. Accordingly, the DC/DC section 112, which is necessary in a conventional system, is not required in the present embodiment, and the efficiency of power transmission is improved.

Collaterally, since the high-frequency power source 20 of FIG. 1 does not require the DC/DC section 112 shown in FIG. 6, heat loss is reduced. Therefore, the present embodiment reduces the electric power required for driving a cooling fan, which further improves the efficiency. Also, the high-frequency power source 20 of FIG. 1 can reduce the number of components and reduce the size accordingly.

(2) The rectifying section 21 of the high-frequency power source 20 performs full-wave rectification to input alternating voltage and smoothes the voltage, thereby outputting direct current as pulses. This stabilizes the waveform.

The present embodiment is not limited to the configuration described above, but may be modified as follows.

In the above illustrated embodiment, the rectifying section 21 of the high-frequency power source 20 performs full-wave rectification and smoothing to the power source of AC 100 volts/200 volts (50 Hz/60 Hz), and outputs the resultant voltage to the DC/RF section 22. In lieu of this, a high-frequency power source may be employed that performs full-wave rectification to a power source of AC 100 volts/200 volts (50 Hz/60 Hz), and outputs the resultant voltage to the DC/RF section 22. In this manner, the rectifying section 21 may be configured to output voltage that is obtained by subjecting alternating voltage to full-wave rectification, as pulses. In this case, the high-frequency power source requires no component for performing smoothing, which simplifies the configuration.

A modification shown in FIGS. 4 and 5 describes a high-frequency power source, which performs only full-wave rectification without performing smoothing. That is, a non-contact power transmission apparatus that shows a waveform diagram of FIGS. 4 and 5 is different from the non-contact power transmission apparatus of FIG. 1 in that the rectifying section 21 of the high-frequency power source 20 performs full-wave rectification but does not perform smoothing.

FIG. 4 includes waveform diagrams representing the maximum output state of the non-contact power transmission apparatus of the modification. FIG. 5 includes waveform diagrams representing the 50% output state of the non-contact power transmission apparatus, and solid lines represent a duty cycle of 50%.

Figure 4A:
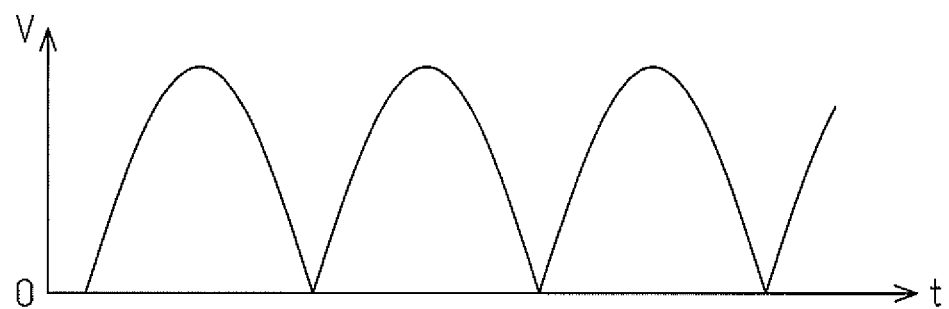
FIGS. 4(a), 4(b), and 4(c) are waveform diagrams showing the input voltage and the output voltage of the DC/RF section and the output voltage to the load when a non-contact power transmission apparatus different from the one shown in FIG. 1 is in the maximum output state, respectively.
Figure 4B:
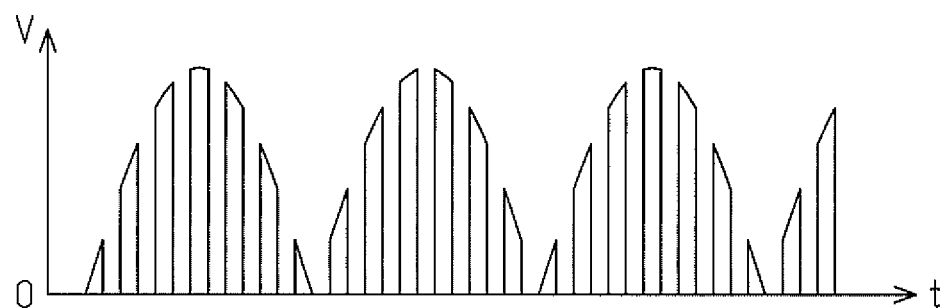
Figure 4C:
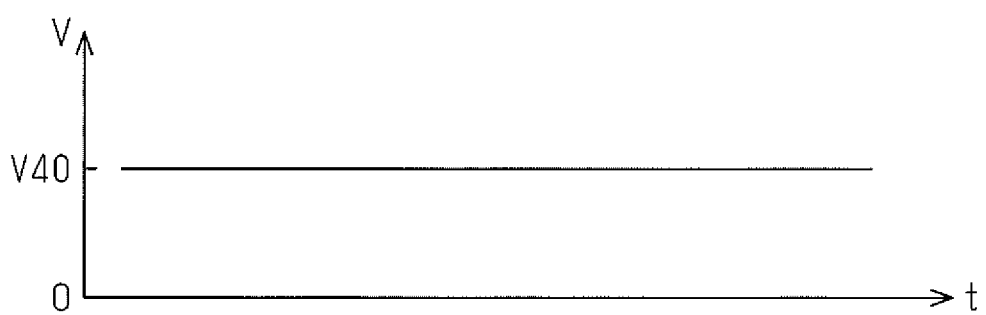

When the non-contact power transmission apparatus of the modification is in the maximum output state, the DC/RF section 22 of the high-frequency power source 20 receives alternate voltage, which has been subjected to full-wave rectification, as shown in FIG. 4(a), and high-frequency voltage is output as shown in FIG. 4(b). Rectification by the rectifier 50 allows the direct voltage of a voltage value of V40 shown in FIG. 4(c) to be supplied to the load 60.

Figure 5A:
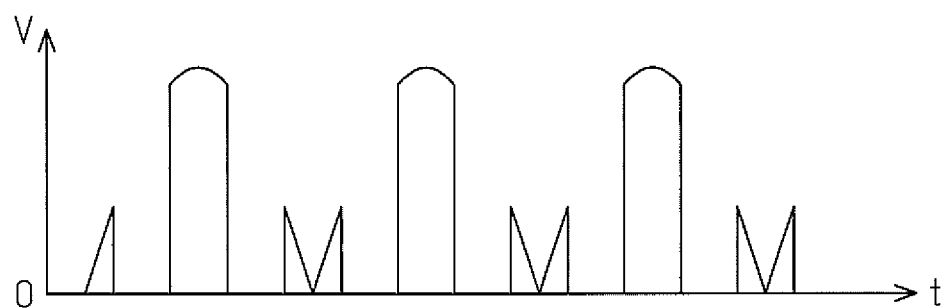
FIGS. 5(a), 5(b), and 5(c) are waveform diagrams showing the input voltage and the output voltage of the DC/RF section and the output voltage to the load when the non-contact power transmission apparatus of FIG. 4 is in the 50% output state, respectively.
Figure 5B:
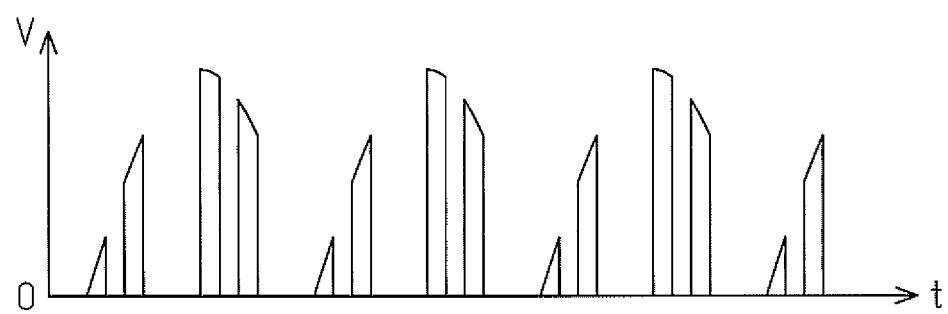
Figure 5C:
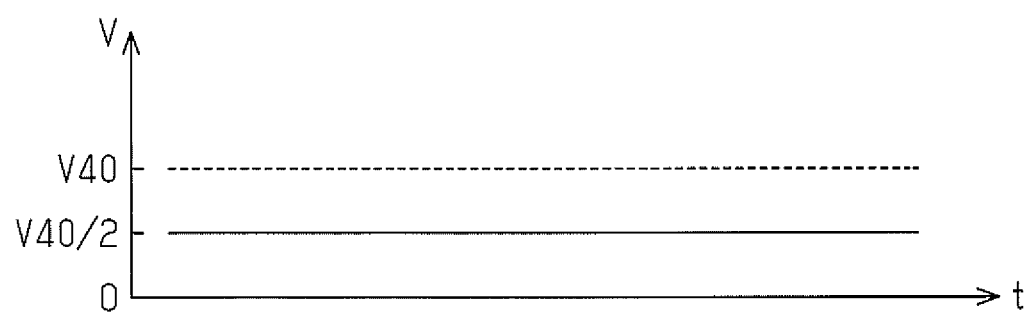

When the non-contact power transmission apparatus of the modification is in the 50% output state, the DC/RF section 22 of the high-frequency power source 20 receives voltage that has been subjected to full-wave rectification and has a duty cycle of 50% as shown in FIG. 5(a). Then, the DC/RF section 22 outputs high-frequency voltage as shown in FIG. 5(b). Each pulse in the waveform of FIG. 5(b) has a width shorter than that of each pulse in the waveform of FIG. 5(a), and is slightly delayed. Rectification by the rectifier 50 allows the direct voltage of a voltage value half the value V40, or (V40)/2, as shown in FIG. 5(c) to be supplied to the load 60.

Accordingly, the non-contact power transmission apparatus of FIGS. 4 and 5 eliminates the necessity for the DC/DC section 112 of FIG. 6, which improves the efficiency of the power source.

The non-contact power transmission apparatus of each of the above embodiments includes a primary induction coil 31, a primary resonance coil 32, a secondary resonance coil 41, and a secondary induction coil 42. However, the non-contact power transmission apparatus may be an apparatus that performs non-contact power transmission by electromagnetic induction. For example, a non-contact power transmission apparatus that performs electromagnetic induction does not have a primary resonance coil 32 or a secondary resonance coil 41, but includes a secondary induction coil 42, and a primary induction coil 31, which can be arranged where it is magnetically connectable with the secondary induction coil 42. The electric power from the primary induction coil 31 is supplied to the secondary induction coil 42 by electromagnetic induction. As in this case, the non-contact power transmission apparatus of the present disclosure may have any configuration as long as it has a primary coil and a secondary coil.

What is claimed:

1. A non-contact power transmission apparatus comprising:
   a high-frequency converting section, which converts input voltage to high-frequency voltage and outputs it;
   a primary coil, which receives high-frequency voltage from the high-frequency converting section;
   a secondary coil, which receives electric power from the primary coil;
   a battery to which the electric power received by the secondary coil is supplied;
   a rectifier located between the secondary coil and the battery; and
   an output adjusting section, which supplies, as pulses, output voltage to the high-frequency converting section, wherein the output adjusting section is configured to increase or reduce output to the battery by adjusting a duty cycle of a pulse output in accordance with a charging status of the battery,
wherein the output adjusting section performs full-wave rectification and smoothing to alternate current, thereby obtaining pulse output of direct voltage.

2. A non-contact power transmission apparatus comprising:
   a high-frequency converting section, which converts input voltage to high-frequency voltage and outputs it;
   a primary induction coil, which receives high-frequency voltage from the high-frequency converting section;
   a primary resonance coil, which receives electric power from the primary induction coil by electromagnetic induction;
   a secondary resonance coil, which receives electric power from the primary resonance coil by magnetic field resonance;
   a secondary induction coil, which extracts electric power received by the secondary resonance coil by electromagnetic induction;
   a battery to which the electric power from the secondary induction coil is supplied;
   a rectifier located between the secondary induction coil and the battery; and
   an output adjusting section, which supplies, as pulses, output voltage to the high-frequency converting section, wherein the output adjusting section is configured to increase or reduce output to the battery by adjusting a duty cycle of a pulse output in accordance with a charging status of the battery,
   wherein the output adjusting section performs full-wave rectification and smoothing to alternate current, thereby obtaining pulse output of direct voltage.

3. A non-contact power transmission apparatus comprising:
   a high-frequency converting section, which converts input voltage to high-frequency voltage and outputs it;
   a primary induction coil, which receives high-frequency voltage from the high-frequency converting section;
   a secondary induction coil, which receives electric power from the primary induction coil;
   a battery to which the electric power received by the secondary induction coil is supplied;
   a rectifier located between the secondary induction coil and the battery; and
   an output adjusting section, which supplies, as pulses, output voltage to the high-frequency converting section, wherein the output adjusting section is configured to increase or reduce output to the battery by adjusting a duty cycle of a pulse output in accordance with a charging status of the battery,
wherein the output adjusting section performs full-wave rectification and smoothing to alternate current, thereby obtaining pulse output of direct voltage.

4. A non-contact power transmission apparatus comprising:
   a high-frequency converting section, which converts input voltage to high-frequency voltage and outputs it;
   a primary coil, which receives high-frequency voltage from the high-frequency converting section;
   a secondary coil, which receives electric power from the primary coil;
   a battery to which the electric power received by the secondary coil is supplied;
   a rectifier located between the secondary coil and the battery; and
   an output adjusting section, which supplies, as pulses, output voltage to the high-frequency converting section, wherein the output adjusting section is configured to increase or reduce output to the battery by adjusting a duty cycle of a pulse output in accordance with a charging status of the battery, wherein the output adjusting section performs full-wave rectification to alternate current, thereby obtaining pulse output of voltage.

5. A non-contact power transmission apparatus comprising:
- a high-frequency converting section, which converts input voltage to high-frequency voltage and outputs it;
- a primary induction coil, which receives high-frequency voltage from the high-frequency converting section;
- a primary resonance coil, which receives electric power from the primary induction coil by electromagnetic induction;
- a secondary resonance coil, which receives electric power from the primary resonance coil by magnetic field resonance;
- a secondary induction coil, which extracts electric power received by the secondary resonance coil by electromagnetic induction;
- a battery to which the electric power from the secondary induction coil is supplied;
- a rectifier located between the secondary induction coil and the battery; and
- an output adjusting section, which supplies, as pulses, output voltage to the high-frequency converting section, wherein the output adjusting section is configured to increase or reduce output to the battery by adjusting a duty cycle of a pulse output in accordance with a charging status of the battery, wherein the output adjusting section performs full-wave rectification to alternate current, thereby obtaining pulse output of voltage.

6. A non-contact power transmission apparatus comprising:
- a high-frequency converting section, which converts input voltage to high-frequency voltage and outputs it;
- a primary induction coil, which receives high-frequency voltage from the high-frequency converting section;
- a secondary induction coil, which receives electric power from the primary induction coil;
- a battery to which the electric power received by the secondary induction coil is supplied;
- a rectifier located between the secondary induction coil and the battery; and
- an output adjusting section, which supplies, as pulses, output voltage to the high-frequency converting section, wherein the output adjusting section is configured to increase or reduce output to the battery by adjusting a duty cycle of a pulse output in accordance with a charging status of the battery, wherein the output adjusting section performs full-wave rectification to alternate current, thereby obtaining pulse output of voltage.

* * * * *